US012566159B2

(12) United States Patent
Mohamad Ishak et al.

(10) Patent No.: US 12,566,159 B2
(45) Date of Patent: Mar. 3, 2026

(54) METHOD FOR ANALYZING PYRROLOQUINOLINE QUINONE

(71) Applicant: Mitsubishi Gas Chemical Company, Inc., Chiyoda-ku (JP)

(72) Inventors: Nur Syafiqah Mohamad Ishak, Niigata (JP); Kazuto Ikemoto, Niigata (JP)

(73) Assignee: Mitsubishi Gas Chemical Company, Inc., Chiyoda-ku (JP)

(*) Notice: Subject to any disclaimer, the term of this patent is extended or adjusted under 35 U.S.C. 154(b) by 981 days.

(21) Appl. No.: 17/440,048

(22) PCT Filed: Mar. 19, 2020

(86) PCT No.: PCT/JP2020/012247
§ 371 (c)(1),
(2) Date: Sep. 16, 2021

(87) PCT Pub. No.: WO2020/189753
PCT Pub. Date: Sep. 24, 2020

(65) Prior Publication Data

US 2022/0146465 A1 May 12, 2022

(30) Foreign Application Priority Data

Mar. 20, 2019 (JP) ................................ 2019-053588

(51) Int. Cl.
*G01N 30/02* (2006.01)
*A23L 2/68* (2006.01)
(Continued)

(52) U.S. Cl.
CPC ................ *G01N 30/06* (2013.01); *A23L 2/68* (2013.01); *A23V 2002/00* (2013.01)

(58) Field of Classification Search
CPC ............. G01N 30/06; G01N 2030/027; G01N 2030/067; G01N 2030/884; G01N 30/88; A23L 2/68; A23V 2002/00
See application file for complete search history.

(56) References Cited

U.S. PATENT DOCUMENTS

2012/0116087 A1 5/2012 Edahiro et al.
2012/0323009 A1 12/2012 Ikemoto et al.
(Continued)

FOREIGN PATENT DOCUMENTS

CN 105334301 A 2/2016
EP 3 739 334 A1 11/2020
(Continued)

OTHER PUBLICATIONS

Harada. JP 2017187321 (English Translation). (Year: 2017).*
(Continued)

*Primary Examiner* — Rebecca M Fritchman
(74) *Attorney, Agent, or Firm* — Oblon, McClelland, Maier & Neustadt, L.L.P.

(57) ABSTRACT

An object is to provide a high performance liquid chromatography method which enables quantitative analysis with the stability of reduced pyrroloquinoline quinone under measurement conditions maintained. The object can be achieved by the following method. A high performance liquid chromatography analysis method, comprising: a sample preparation step of preparing a sample for high performance liquid chromatography containing reduced pyrroloquinoline quinone or a salt thereof from a specimen and a separation step of separating the reduced pyrroloquinoline quinone or a salt thereof contained in the sample for high performance liquid chromatography from the specimen using interaction between a stationary phase and a mobile phase by a high performance liquid chromatography method using a reversed phase column as the stationary phase and
(Continued)

using an eluent comprising 0.050 to 1.5% by mass of phosphoric acid and/or hydrochloric acid and 20 to 50% by volume of methanol and/or acetonitrile as the mobile phase.

8 Claims, 4 Drawing Sheets

(51) Int. Cl.
*G01N 30/06* (2006.01)
*G01N 30/88* (2006.01)

(56) References Cited

U.S. PATENT DOCUMENTS

2013/0253001 A1* 9/2013 Ikemoto ............... C07D 471/04
514/292
2017/0291898 A1* 10/2017 Mori ....................... A61P 43/00

FOREIGN PATENT DOCUMENTS

JP 2017187321 A * 10/2017
WO WO 2011/007633 A1 1/2011
WO WO 2011/102387 A1 8/2011

OTHER PUBLICATIONS

Kano. High Performance Liquid Chromatographic Determination of Pyrroloquinoline Quinone as Acetone Adduct. Analytical Sciences. 1991 (Year: 1991).*

Duine. Structure and Activity of the Prosthetic Group of Methanol Dehydrogenase. European Journal of Biochemistry. 1980. (Year: 1980).*

Van der Meer. Determination of PQQ in quinoproteins with covalently bound cofactor and in PQQ-derivatives. 1989. (Year: 1989).*

International Search Report issued on Jun. 2, 2020 in PCT/JP2020/012247 filed on Mar. 19, 2020, 3 pages.

Itoh et al., "Reaction of Reduced PQQ ($PQQH_2$) and Molecular Oxygen", Bull. Chem. Soc. Jpn., 1986, vol. 59, No. 6, pp. 1911-1914.

Ikemoto et al., "HPLC Analysis of Pyrroloquinoline Quinone in Capsules", Bunseki Kagaku (Analytical Chemistry), 2016, vol. 65, No. 6, pp. 339-342 (with English Abstract) (5 total pages).

Duine et al., "Characterization of the Second Prosthetic Group in Methanol Dehydrogenase from *Hyphomicrobium* X", Eur. J. Biochem., 1981, vol. 118, pp. 395-399.

Zhang et al., "High Performance Liquid Chromatographic Separation and pH-dependent Electrochemical Properties of Pyrroloquinoline Quinone and Three Closely Related Isomeric Analogues", Biochemical and Biophysical Research Communications, 1995, vol. 212, No. 1, pp. 41-47.

Noji et al., "Simple and Sensitive Method for Pyrroloquinoline Quinone (PQQ) Analysis in Various Foods Using Liquid Chromatography/Electrospray-Ionization Tandem Mass Spectrometry", Journal of Agricultural and Food Chemistry, 2007, vol. 55, No. 18, pp. 7258-7263.

Mukai et al., "Pyrroloquinoline quinone (PQQ) is reduced to pyrroloquinoline quinol ($PQQH_2$) by vitamin C, and $PQQH_2$ produced is recycled to PQQ by air oxidation in buffer solution at pH 7.4" Bioscience, Biotechnology, and Biochemistry, 2016, vol. 80, No. 1, pp. 178-187 (11 total pages).

Duine, J.A., et al., "Detection and Determination of Pyrroloquinoline Quinone, the Coenzyme of Quinoproteins", Analytical Biochemistry, Academic Press, Amsterdam, NL, vol. 133, No. 1, Aug. 1, 1983 (Aug. 1, 1983), pp. 239-243, XP04822866.

* cited by examiner

METHOD FOR ANALYZING PYRROLOQUINOLINE QUINONE

CROSS-REFERENCE TO RELATED APPLICATIONS

This application is a national stage application of International Application No. PCT/JP2020/012247, filed Mar. 19, 2020, which is based upon and claims the benefit of priority to Japanese Patent Application No. 2019-053588, filed Mar. 20, 2019. The entire contents of these applications are incorporated herein by reference.

TECHNICAL FIELD

The present invention relates to the quantitative analysis method of oxidized and reduced pyrroloquinoline quinone or a salt thereof.

BACKGROUND ART

Pyrroloquinoline quinone (hereinafter occasionally called merely "PQQ") is a substance in which a pyrrole ring is condensed with a quinoline ring to make an o-quinone structure. This substance may be called oxidized PQQ. This quinone structure is easily reduced to form reduced pyrroloquinoline quinone. Reduced PQQ changes into oxidized PQQ by oxidation with air. It is known that the oxidation and reduction are thus conducted between oxidized pyrroloquinoline quinone and reduced pyrroloquinoline quinone easily. It is known that these oxidized PQQ and reduced PQQ have different UV spectra (Non Patent Literature 1).

PQQ is considered to have many important physiological activities such as the effect of promoting the proliferation of cells, an anti-cataract effect, the effect of preventing and treating liver disease, the effect of promoting the healing of wounds, an antiallergic effect, the effect of inhibiting reverse transcriptase, the effect of inhibiting glyoxylase I, and an anticancer effect. Industrial importance of utilizing PQQ is increasing. A pyrroloquinoline quinone disodium salt is actually used as a food (Patent Literature 1).

The calculation of the accurate measurement data of PQQ in foods has been required in the system of foods with functional claims using functionality. In many foods, there is no products consisting of PQQ alone, and PQQ is provided as a mixture with various substances. Meanwhile, PQQ reacts with many food components easily, and is easily interfered with at the time of analysis. The analysis is the analysis of the content contained in a capsule or a tablet in milligram order.

The analysis method for oxidized PQQ has heretofore been used in the case of the analysis method of PQQ. High performance liquid chromatography (HPLC) is a method for analyzing nonvolatile substances, and analysis with high sensitivity has been also developed. However, no analysis method suitable for the quantification of oxidized PQQ and reduced PQQ has been reported. The separation of oxidized PQQ and reduced PQQ has not been reported in detail.

Pyrroloquinoline quinone easily changes into reduced pyrroloquinoline quinone by reacting with a reducing substance. Non Patent Literature 1 reports a method for suppressing this interference at the time of analysis. This method is a method for conducting a step of removing ascorbic acid by air oxidation before measurement and then conducting HPLC analysis for suppressing interference due to ascorbic acid. The method is a method for removing ascorbic acid which is a reducing agent and detecting all as the oxidized type since the oxidized type and the reduced type of pyrroloquinoline quinone cannot be separated under this analysis condition.

Meanwhile, reducing agents represented by ascorbic acid are blended in various foods. A large amount of reducing agents is blended especially in beverages in consideration also of a role as acidulants.

When PQQ is simultaneously blended in such foods, there is a large amount of a reducing agent, and it is highly likely that long-period treatment is necessary, or PQQ cannot be analyzed, using the method for removing the reducing agent by air oxidation. Therefore, an analysis method which enables analyzing reduced PQQ directly and calculating an accurate amount blended has been desired.

A method for finding the state in a mixture by separating oxidized PQQ and reduced PQQ has been desired. Furthermore, a pretreatment method for converting all into reduced PQQ for quantification has also been desired.

CITATION LIST

Patent Literature

Patent Literature 1
Japanese Translation of PCT International Application Republication 2011/007633

Non Patent Literature

Non Patent Literature 1
Itoh et al, Bull. Chem. Soc. Jpn, 1986, vol 59, pp 1911-1914
Non Patent Literature 2
Kazuto Ikemoto et al, Bunseki Kagaku (Analytical chemistry) Vol. 65, No. 6, pp. 339-342 (2016)

SUMMARY OF INVENTION

Technical Problem

In the conventional method, reduced pyrroloquinoline quinone has a problem with the stability under measurement conditions such as oxidation with air (including dissolved oxygen contained in liquid). Therefore, a method for quantifying reduced pyrroloquinoline quinone accurately has not been established.

If reduced pyrroloquinoline quinone can be stabilized under measurement conditions, and its amount can be quantified, reduced PQQ and oxidized PQQ can be separated in a method using HPLC, and a method for enabling accurate quantification of the oxidized type and the reduced type can be established. In addition to this, a new method for converting all into the reduced type for measurement can be established to find the total amount oxidized and reduced pyrroloquinoline quinone contained in a specimen.

The present invention has been completed in view of the above-mentioned problem, and an object of the present invention is to provide a high performance liquid chromatography method which enables quantitative analysis with the stability of reduced pyrroloquinoline quinone under measurement conditions maintained.

When a measuring object containing PQQ in milligram order and many other coexisting components, such as a beverage, is an object to be measured, PQQ contained in the measurement object can be quantified rapidly and easily without being influenced by the coexisting components.

Solution to Problem

The present inventors have examined earnestly to solve the above-mentioned problem, consequently found that the above-mentioned problem can be solved using a reversed phase column as a stationary phase and using predetermined eluent as a mobile phase, and completed the present invention.

That is, the present invention is as follows.

[1]

A high performance liquid chromatography analysis method, comprising:

a sample preparation step of preparing a sample for high performance liquid chromatography containing reduced pyrroloquinoline quinone or a salt thereof from a specimen and a separation step of separating the reduced pyrroloquinoline quinone or a salt thereof contained in the sample for high performance liquid chromatography from the specimen using interaction between a stationary phase and a mobile phase by a high performance liquid chromatography method using a reversed phase column as the stationary phase and using an eluent comprising 0.050 to 1.5% by mass of phosphoric acid and/or hydrochloric acid and 20 to 50% by volume of methanol and/or acetonitrile as the mobile phase.

[2]

The high performance liquid chromatography analysis method according to [1], wherein the pH of the eluent is 2.8 or less.

[3]

The high performance liquid chromatography analysis method according to [1] or [2], wherein when the sample for high performance liquid chromatography further comprises oxidized pyrroloquinoline quinone, in the separation step, the reduced pyrroloquinoline quinone and the oxidized pyrroloquinoline quinone contained in the sample for high performance liquid chromatography are separated.

[4]

The high performance liquid chromatography analysis method according to [1] or [2], further comprising:

a reduction treatment step of adding a reducing agent to the specimen before the sample preparation step.

[5]

The high performance liquid chromatography analysis method according to [4], wherein the reducing agent is an ascorbic acid solution.

[6]

The high performance liquid chromatography analysis method according to any one of [1] to [5], wherein the specimen is a beverage.

Advantageous Effects of Invention

According to the present invention, a high performance liquid chromatography method which enables quantitative analysis with the stability of reduced pyrroloquinoline quinone under measurement conditions maintained can be provided.

When a measuring object containing PQQ and many other coexisting components, such as a beverage, is an object to be measured, an analysis method in which PQQ contained in the measurement object can be quantified rapidly and easily without being influenced by the coexisting components can therefore be provided. Especially when a reducing substance is contained, the quantification of PQQ in various products including foods is established in a wide range of concentration by detecting PQQ as reduced PQQ, and the quantification can contribute to development of health foods, medicaments, or the like related to PQQs.

DESCRIPTION OF EMBODIMENTS

Figure 1:
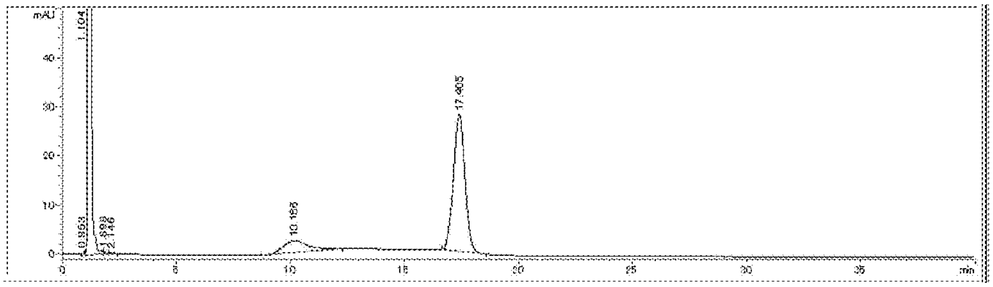
FIG. 1 shows a chromatograph obtained in Example 1.

Although embodiments of the present invention (hereinafter called "the present embodiments") will be described in detail hereinafter, the present invention is not limited to these. As long as the embodiments do not deviate from the gist of the present invention, the embodiments can be modified variously.

[Analysis Method]

A high performance liquid chromatography analysis method of the present embodiment comprises a sample preparation step of preparing a sample for HPLC containing reduced pyrroloquinoline quinone or a salt thereof from a specimen and a separation step of separating the reduced pyrroloquinoline quinone or a salt thereof contained in the sample for HPLC from the specimen using interaction between a stationary phase and a mobile phase by a high performance liquid chromatography method using a reversed phase column as the stationary phase and using an eluent comprising 0.050 to 1.5% by mass of phosphoric acid and/or hydrochloric acid and 20 to 50% by volume of methanol and/or acetonitrile as the mobile phase.

Reduced pyrroloquinoline quinone is generally subjected to air oxidation easily. When the oxidation of reduced pyrroloquinoline quinone proceeds during analysis, accurate analysis results cannot be obtained. According to the analysis method of the present embodiment, the conversion of reduced pyrroloquinoline quinone into the oxidized type during analysis can meanwhile be suppressed, and analysis can be performed with the stability of reduced pyrroloquinoline quinone maintained.

In the measurement of a specimen containing reduced pyrroloquinoline quinone and oxidized pyrroloquinoline quinone, all can therefore be converted into reduced pyrroloquinoline quinone and measured. This enables quantification of the total amount of pyrroloquinoline quinone contained in the specimen by one measurement.

In the present embodiment, the ability to separate reduced pyrroloquinoline quinone and oxidized pyrroloquinoline quinone is improved using the above-mentioned predetermined mobile phase, and both can also be separated and quantified separately.

[Sample Preparation Step]

The sample preparation step is a step of preparing a sample for HPLC containing reduced pyrroloquinoline quinone or a salt thereof from a specimen. A pretreatment step, a reduction treatment step, a liquid separation step, and a centrifugation step mentioned below may be performed before the sample preparation step, if needed.

(Analyte)

Pyrroloquinoline quinone which is an analyte in the analysis method of the present embodiment will be shown below. PQQ includes oxidized PQQ represented by the following formula (1) and reduced PQQ represented by the following formula (2). When a substance is displayed as pyrroloquinoline quinone, the pyrroloquinoline quinone usually indicates oxidized PQQ. A pyrroloquinoline quinone disodium salt n hydrate is sold as foods, and this is also included in analyte. The state can vary, from a state in which oxidized PQQ is in a relatively large amount to a state in which reduced PQQ is in a relatively large amount, depending on the environment. For example, reduced PQQ exists in a relatively large amount in a solution because reduction proceeds easily, whereas oxidized PQQ exists in a relatively large amount in an oxidation environment. According to the analysis method of the present embodiment, the total amount of oxidized PQQ and reduced PQQ can be quantified with respect to this point.

(1)

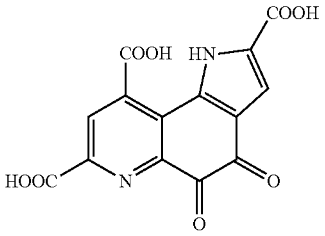

(2)

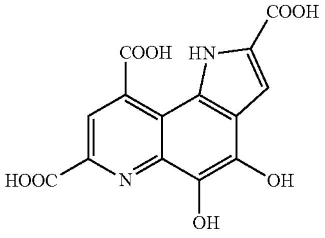

Although the salt of the above-mentioned pyrroloquinoline quinone which is an analyte is not particularly limited, examples thereof include salts with metals such as alkali metals and alkaline-earth metals; and salts with nonmetals such as ammonium cations. Especially the disodium salt, which is a type of alkali metal salt, is frequently used as foods, and is important as the analyte.

(Specimen)

Although the specimen (measurement object) containing pyrroloquinoline quinone is not particularly limited, examples thereof include foods (including beverages), medicaments, and quasi drugs. Examples of the foods include foods in general and foods with health claims (for example, foods for specified health uses, foods with functional claims, and foods with nutrient function claims). Examples of a more specific specimen include drugs and supplements for oral administration such as capsules, tablets, powders, and granules; beverages; jellies; gummi candies; and other foods such as retort foods. The specimen can be cosmetics, detergents, other external preparations, and the like, which are not food or drink, besides the above, and can be general products containing PQQ.

(Pretreatment Step)

In the sample preparation step, the pretreatment step depending on the shape of the measurement object may be conducted. The measurement object can be suitably treated so that the sample is easily mixed, for example, by cutting a capsule if the measurement object is the capsule, pulverizing a tablet if the measurement object is the tablet, or the like.

(Reduction Treatment Step)

The reduction treatment step of adding a reducing agent to the specimen may be performed before the sample preparation step. When the specimen contains oxidized pyrroloquinoline quinone, all the oxidized pyrroloquinoline quinone contained in the specimen is preferably converted into reduced pyrroloquinoline quinone in this case. This enables quantification of the total amount of the reduced pyrroloquinoline quinone and oxidized pyrroloquinoline quinone contained in the specimen by one analysis.

As another viewpoint, a component which reacts with oxidized PQQ before or after the sample preparation step, or during the step to form an unspecified analog may be contained in the specimen. Such a component can cause the interference of the analysis. Especially an amino group-containing substance tends to cause such interference easily. More specific examples thereof include essential amino acids, theanine, ornithine, and protein-containing substances.

When the specimen thus contains the compound which can react with oxidized PQQ, an operation for converting PQQ into the reduced type can be performed. For example, a reduction treatment step of converting oxidized PQQ in the specimen into reduced PQQ may be performed by adding a reducing agent to the specimen. Reduced PQQ which is the main measurement object in the analysis method of the present embodiment is excellent in stability unlike oxidized PQQ in that reduced PQQ does not react with optional components such as amino acids. Quantitative analysis can be performed thereby without being interfered with by the optional components coexisting in the sample for HPLC. Reduced PQQ is different from oxidized PQQ in the elution time in the liquid chromatography, and the peaks in a chromatogram are easily separated.

Although the reducing agent is not particularly limited, examples thereof include conventionally known substances such as ascorbic acid. The generation of reduced PQQ can proceed efficiently and preferentially using the reducing agent, and the influence of the above-mentioned interfering substances can be excluded. The mode of ascorbic acid added as a reducing agent is not particularly limited, may be an aqueous solution or powdered. When the ascorbic acid is used in the form of an aqueous solution, water or a buffer solution may be used as a solvent.

Although the method for adding the reducing agent to the specimen is not particularly limited, examples thereof include a method in which pyrroloquinoline quinone or a salt thereof and ascorbic acid coexist in an aqueous solution such as water or a buffer solution. The temperature and the time of reaction which generates reduced PQQ by the method can be adjusted depending on the PQQ concentration or the interfering substance concentration and are not particularly limited.

Among these, the reaction temperature is preferably 0 to 120° C., more preferably 10 to 90° C., and further preferably 20 to 80° C. The reaction time is preferably 5 minutes to 2 days, more preferably 10 minutes to 24 hours, and further preferably 10 minutes to 10 hours. Furthermore, the pH of the aqueous solution is preferably 1 to 3, and more preferably 1.5 to 2.5.

The amount of the reducing agent used is preferably largely excessive based on pyrroloquinoline quinone. More specifically, the amount of the reducing agent used is preferably 100 to 1000000 parts by mass, more preferably 500 to 500000 parts by mass, and further preferably 1000 to 100000 parts by mass based on 1 part by mass of pyrroloquinoline quinone.

(Liquid Separation Step)

A compound which may interfere with the analysis by inhibiting the extraction of PQQ in the sample preparation step can also be contained in the specimen. Although such a compound is not particularly limited, examples thereof include fat-soluble components. More specific examples of the fat-soluble components include fats/oils such as edible fat/oil, non-edible fat/oil, animal fat/oil, and vegetable fat/oil; lipoic acid; docosahexaenoic acid (DHA); eicosapentaenoic acid (EPA); lipids such as lecithin; fat-soluble vitamins such as vitamin E and derivatives thereof; glycerylphosphorylcholine; and magnesium stearate. Among these, fats/oils have a high interfering effect, and prevent quantification easily.

When the specimen contains fat-soluble components, an operation for removing this can be performed. For example, the liquid separation step of further mixing an organic solvent incompatible with water, dissolving the fat-soluble components in the measurement object in the organic solvent, and then removing the organic solvent to prepare a sample for HPLC from which the fat-soluble components in the measurement object is removed may be performed. Especially when the measurement object contains fat-soluble components, the quantification accuracy of PQQ (the oxidized type or the reduced type) tends to be further improved by performing the liquid separation operation, extracting the fat-soluble component into the organic layer, and extracting PQQ (the oxidized type or the reduced type) into the aqueous layer.

Although the organic solvent which can be used in the liquid separation treatment is not particularly limited, examples thereof include ethyl acetate, chloroform, methylene chloride, cyclohexane, toluene, hexane, dimethylformamide, dimethyl sulfoxide, and acetone. Among these, ethyl acetate, chloroform, and methylene chloride are preferable, and ethyl acetate, which has high biodegradability, is more preferable from the viewpoint that water-solubility is low. When the fat-soluble components are not contained, the liquid separation operation can be omitted. The quantification accuracy of PQQ tends to be further improved by performing the liquid separation operation.

(Centrifugation Step)

Examples of other substances which inhibit the extraction of PQQ in the sample preparation step include powder components. Although the powder components are not particularly limited, examples thereof include inorganic powder such as silica and organic powder such as rice flour.

When the specimen contains powder components, an operation for removing these can be performed. For example, when the measurement object contains powder components such as insoluble components, a centrifugation operation may be performed (centrifugation step). The centrifugation operation may be used to separate the aqueous layer and the organic layer in the process of the liquid separation operation.

(Dilution Step)

A diluent may be added to the sample for HPLC to adjust the concentrations of PQQ or other components to concentrations suitable for HPLC measurement. Although the diluent is not particularly limited, examples thereof include organic solvents such as methanol and acetonitrile which are mixed with water, and water. A mixed solvent thereof may be used as the diluent.

When the diluent contains water, the diluent is preferably acidic. When the diluent is added, a reducing agent such as ascorbic acid may be further added. Reduced PQQ can be maintained more stable thereby.

Moreover, HPLC eluent may be used as the diluent. The difference between the composition of the sample to be introduced into HPLC and the composition of HPLC eluent decreases thereby. Therefore, shock peaks, disorders of peak shapes and the fluctuation of the elution time can be deterred.

(Sample for HPLC)

The sample for HPLC obtained as mentioned above can contain reduced PQQ or the salt thereof obtained by reacting oxidized pyrroloquinoline quinone, reduced pyrroloquinoline quinone, or a salt thereof with ascorbic acid, unreacted ascorbic acid, and other components contained in the measurement object.

The content of ascorbic acid contained in the sample for HPLC is preferably 1 to 40% by mass, more preferably 3 to 20% by mass, and further preferably 3 to 10% by mass.

[Separation Step]

The separation step is a step of separating reduced pyrroloquinoline quinone or a salt thereof contained in the sample for HPLC from the specimen using interaction between a stationary phase and a mobile phase by a high performance liquid chromatography method using a reversed phase column as the stationary phase and using an eluent comprising 0.050 to 1.5% by mass of phosphoric acid and/or hydrochloric acid and 20 to 50% by volume of methanol and/or acetonitrile as the mobile phase.

Reduced PQQ and oxidized PQQ contained in the sample for HPLC can be quantified separately thereby. When the specimen is subjected to the reduction step, the total amount of reduced PQQ and oxidized PQQ contained in the specimen can be quantified.

Although the quantification method is not particularly limited, examples thereof include the standard addition method, the internal standard method, and the absolute calibration method. The quantification method may be adopted in view of the required accuracy and correction.

A standard addition method which can be used in the present embodiment is the same as the usual method. Examples thereof include a method in which the chromatogram of the sample for HPLC is obtained using a detector which can detect oxidized PQQ or reduced PQQ, and the salt thereof, and imidazopyrroloquinoline and a salt thereof contained in the sample for HPLC are quantified from a calibration curve beforehand produced based on the area of the peak. When the calibration curve is produced, standard solutions having known concentrations are beforehand prepared, the standard solutions are added to the sample for HPLC, and a sample group is prepared for producing the calibration curve.

Liquid chromatography (LC) such as high performance liquid chromatography (HPLC) is mentioned for the present embodiment. An HPLC device comprises a separation column and a pump which feeds a separation solution to the separation column. The HPLC device may comprises other constituents such as an autosampler, a heater, and a detector for detecting separated components. Examples of the detector include a UV detector, a fluorescence detector, and a mass spectroscope.

(Stationary Phase)

A reversed phase column is used as a separation column which is a stationary phase. Although examples of the reversed phase column include a column filled with an octadecylsilylated silica gel packing material (octadecylsilyl (ODS) column), a column filled with silica gel into which octyl groups are introduced (C8 column), a column filled with silica gel into which ethyl groups are introduced (C2 column), and columns in which ion-exchange resins are blended with these types of silica gel, especially the ODS column is preferable.

The particle size of the packing material is preferably 5.0 μm or less and more preferably 1.7 to 5.0 μm. When the particle size of the packing material is in the above-mentioned range, the separation ability tends to be further improved.

(Mobile Phase)

Eluent used as a mobile phase contains 0.050 to 1.5% by mass of phosphoric acid and/or hydrochloric acid and 20 to 50% by volume of methanol and/or acetonitrile. The use of such an eluent enables measurement of reduced PQQ in a stable state and also separation of oxidized PQQ and reduced PQQ.

The eluent contains either or both of phosphoric acid and hydrochloric acid. Then, "0.050 to 1.5% by mass of phosphoric acid and/or hydrochloric acid" means the concentration of phosphoric acid or hydrochloric acid when the eluent contains either phosphoric acid or hydrochloric acid and the total amount of phosphoric acid and hydrochloric acid when the eluent contains both phosphoric acid and hydrochloric acid. Based on this, the concentration of phosphoric acid and/or hydrochloric acid is 0.050 to 1.5% by mass, preferably 0.085 to 1.5% by mass, more preferably 0.1 to 1.5% by mass, and further preferably 0.2 to 1% by mass. When the concentration of phosphoric acid and/or hydrochloric acid is in the above-mentioned range, the separation ability is improved, reduced PQQ can be measured in a stable state, and oxidized PQQ and reduced PQQ can also be separated. In addition to phosphoric acid and hydrochloric acid, other acid components may be added.

The eluent contains either or both of methanol and acetonitrile. Then, "20 to 50% by volume of methanol and/or acetonitrile" means the concentration of methanol or acetonitrile when the eluent contains either methanol or acetonitrile and the total amount of methanol and acetonitrile when the eluent contains both methanol and acetonitrile. Based on this, the content of methanol and/or acetonitrile is 20 to 50% by volume, preferably 25 to 45% by volume and more preferably 27.5 to 42.5% by volume. It is also preferable that the content of methanol and/or acetonitrile be 30 to 50% by volume, 30 to 45% by volume, or 30 to 42.5% by volume. When the content of methanol and/or acetonitrile is in the above-mentioned range, the separation ability is improved, reduced PQQ can be measured in a stable state, and oxidized PQQ and reduced PQQ can also be separated. In addition to methanol and acetonitrile, other organic solvents may be added.

The pH of the eluent is preferably 2.8 or less, more preferably 2.3 or less, and further preferably 2.1 or less. When the pH of the eluent is in the above-mentioned range, the separation ability is improved, reduced PQQ can be measured in a stable state, and oxidized PQQ and reduced PQQ can also be separated.

Although the elution method is not particularly limited, examples thereof include an isocratic elution method in which the composition of the mobile phase (eluent) is not changed during liquid feeding and a gradient elution method in which the composition of the mobile phase (eluent) is changed during liquid feeding. The elution method can be suitably selected depending on separation ability.

The analysis method of the present embodiment has the following advantages and characteristics in PQQ quantitative analysis. First, also when a reducing substance such as ascorbic acid is contained, oxidized PQQ and reduced PQQ can be detected. Second, quantification and calculation are easy by detecting all as reduced PQQ. Ascorbic acid, which converts oxidized PQQ into reduced PQQ, is low-priced and safe.

EXAMPLES

Hereinafter, the present invention will be described more specifically using the Examples and the Comparative Examples. The present invention is not limited in any way by the following Examples.

Methods for preparing samples used for analysis will be described below. Guaranteed reagents produced by Wako Pure Chemicals were used as reagents used in the Examples unless otherwise specified. BioPQQ® manufactured by MITSUBISHI GAS CHEMICAL COMPANY, INC. was used as a pyrroloquinoline quinone disodium salt.

Example 1: Conditions for Separating Oxidized PQQ and Reduced PQQ (Eluent 1)

Eluent used in Example 1 was obtained by mixing water and methanol at a volume ratio 73:27 and adding phosphoric acid to the mixed liquid so that the content of phosphoric acid was 0.34% by mass.

(HPLC Analysis Conditions)

Analyzer: Agilent 1100 series (manufactured by Agilent Technologies, Inc.)

Reversed phase column: ODS column (pH range: 2 to 7.5) 5 μm in particle size and 4.6 mm in inner diameter×150 mm in length Eluent 1: 27% by volume methanol/0.34% by mass phosphoric acid (pH 2.1)

Flow velocity: 1.5 mL/min

Column temperature: 40° C.

Injection volume: 20 μL

Detector UV: 259 nm, 320 nm

Analysis time: 30 min (Analysis)

An aqueous pyrroloquinoline quinone disodium salt solution (40 mg/L) and an aqueous ascorbic acid solution (2 g/L) were mixed to prepare Analysis Sample 1. Analysis operation was performed under the above-mentioned HPLC analysis conditions within 120 minutes after the preparation of Analysis Sample 1. FIG. 1 shows its chromatogram.

Analysis operation was separately performed under the above-mentioned HPLC analysis conditions using, as samples, an aqueous ascorbic acid solution alone and an aqueous pyrroloquinoline quinone disodium salt solution alone fully exposed to air and converted into the oxidized type to obtain respective chromatograms. The chromatogram when the aqueous ascorbic acid solution alone is a sample showed that the elution time of ascorbic acid was 1.1 minutes. The chromatogram when the aqueous pyrroloquinoline quinone disodium salt solution alone fully exposed to air is a sample showed that the elution time of the oxidized pyrroloquinoline quinone disodium salt was 10.2 minutes.

The peaks corresponding to the elution times of ascorbic acid and the oxidized pyrroloquinoline quinone disodium salt were specified in the chromatogram obtained using Analysis Sample 1, and a peak other than the elution times of ascorbic acid and the oxidized pyrroloquinoline quinone disodium salt was identified as a peak derived from the reduced pyrroloquinoline quinone disodium salt. Here, the elution time of the reduced pyrroloquinoline quinone disodium salt was 17.4 minutes.

To confirm that the elution times of the components identified as mentioned above indicate ascorbic acid, the oxidized pyrroloquinoline quinone disodium salt, and the reduced pyrroloquinoline quinone disodium salt, respectively, from another viewpoint, the absorption in the UV-VIS at the elution times was measured by photodiode array analysis in addition to analysis with the above-mentioned detector UV.

Figure 2:
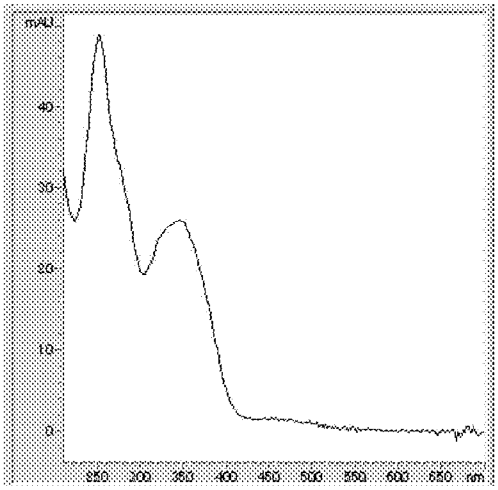
FIG. 2 shows the absorption spectrum in the UV-VIS of a fraction at an elution time of 10.2 minutes in the chromatogram in FIG. 1.

Specifically, while the separation was performed with the HPLC analyzer, the spectrum of the eluate which flows out of the reversed phase column was measured without stopping liquid feeding. FIG. 2 shows the absorption spectrum in the UV-VIS at an elution time of 10.2 minutes, and FIG. 3 shows the absorption spectrum in the UV-VIS at an elution time of 17.4 minutes.

Figure 3:
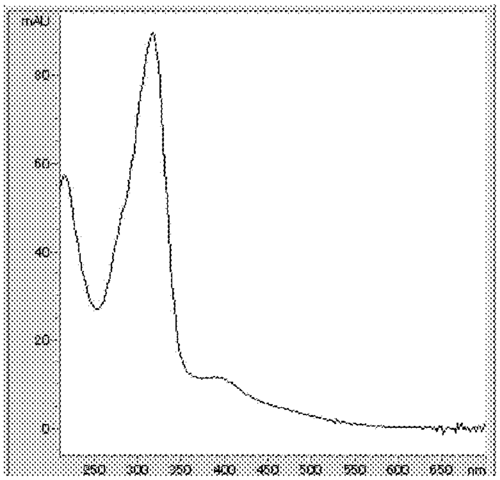
FIG. 3 shows the absorption spectrum in the UV-VIS of a fraction at an elution time of 17.4 minutes in the chromatogram in FIG. 1.

In FIG. 2, a spectrum exhibiting the maximum absorption at 270 nm was obtained, and in FIG. 3, a spectrum exhibiting the maximum absorption at 320 nm was obtained. The characteristics of these spectra match the characteristics of the spectra of an oxidized pyrroloquinoline quinone disodium salt and a reduced pyrroloquinoline quinone disodium salt reported so far (literature (Non Patent literature 1 by Itoh et al.)). It could be confirmed again thereby that the peak at an elution time of 10.2 minutes was derived from the oxidized pyrroloquinoline quinone disodium salt, and a peak at an elution time of 17.4 minutes was derived from the reduced pyrroloquinoline quinone disodium salt.

Comparative Example 1: Existing Analysis Method (Eluent 2: HPLC eluent (100 mM $CH_3COOH$/100 mM $CH_3COONH_4$=30/70 (pH 5.1)))

First, 6.0 g of $CH_3COOH$ was dissolved with distilled water and diluted to a total volume of 1 L to prepare 100 mM $CH_3COOH$ (liquid 1). Separately from this, 7.71 g of $CH_3COONH_4$ was dissolved in distilled water and diluted to a total volume of 1 L to prepare 100 mM $CH_3COONH_4$ (liquid 2). Then, 300 mL of the liquid 1 and 700 mL of liquid 2 were mixed to obtain HPLC eluent. It was confirmed that the pH of the obtained buffer solution was 5.1±0.2.

(HPLC Analysis Conditions)

Liquid-feeding unit: LC-10AD (manufactured by SHIMADZU CORPORATION)

Reversed phase column: YMC-Pack ODS-A

5 μm in particle size and 4.6 mm in inner diameter×150 mm in length

Eluent 2: 100 mM $CH_3COOH$/100 mM $CH_3COONH_4$=30/70 (pH 5.1)

Flow velocity: 1.5 mL/min

Column temperature: 40° C.

Injection volume: 3 μL

Detector UV: 259 nm

Analysis time: 30 min (Analysis)

Analysis Sample 1 was prepared in the same way as mentioned above. Analysis operation was performed under the above-mentioned HPLC analysis conditions within 120 minutes after the preparation of Analysis Sample 1 to obtain a chromatogram. Analysis operation was separately performed under the above-mentioned HPLC analysis conditions using, as samples, an aqueous ascorbic acid solution alone and an aqueous pyrroloquinoline quinone disodium salt solution alone fully exposed to air to obtain respective chromatograms.

The chromatogram when the aqueous ascorbic acid solution alone was used as a sample showed that the elution time of ascorbic acid was 1.1 minutes. The chromatogram when the aqueous pyrroloquinoline quinone disodium salt solution alone fully exposed to air was used as a sample showed that the elution time of the oxidized pyrroloquinoline quinone disodium salt was 2.1 minutes.

In the chromatogram obtained using Analysis Sample 1, peaks were observed at two points at an elution time of 1.1 minutes and 2.1 minutes, and peaks other than those could not be confirmed. It could be confirmed from this result that the oxidized pyrroloquinoline quinone disodium salt and the reduced pyrroloquinoline quinone disodium salt could not be separated under the analysis conditions of Comparative Example 1.

Examples 2 to 7 and Comparative Example 2

Analysis was performed in the same way as under the analysis conditions of Example 1 except that the column and the eluent were changed as shown in the following Table 1, and it was confirmed whether the oxidized pyrroloquinoline quinone disodium salt and reduced pyrroloquinoline quinone disodium salt in Analysis Sample 1 could be separated or not.

Table 1 shows the analysis conditions of Examples 2 to 7 and Comparative Example 2 and the elution times of ascorbic acid, the oxidized pyrroloquinoline quinone disodium salt, and the reduced pyrroloquinoline quinone disodium salt.

TABLE 1

| | Column | Eluent | Ascorbic acid (min) | Oxidized PQQ (min) | Reduced PQQ (min) |
|---|---|---|---|---|---|
| Example | | | | | |
| 2 | ODS Column (pH range 2-7.5) | 35% by volume Methanol/0.34% by mass Phosphoric acid (pH 2.1) | 1.1 | 5.1 | 9.7 |
| 3 | Particle size 5 μm Inner diameter 4.6 mm | 35% by volume Methanol/4% by volume Acetonitrile 0.34% by mass Phosphoric acid (pH 2.1) | 1.1 | 3.5 | 5.8 |
| 4 | Length 150 mm | 35% by volume Methanol/0.085% by mass Phosphoric acid (pH 2.8) | 1.1 | 7.5 | 9.0 |
| 5 | ODS Column (pH range 1-10) | 27% by volume Methanol/0.34% by mass Phosphoric acid (pH 2.1) | 1.2 | 4.9 | 13.5 |
| 6 | Particle size 5 μm Inner diameter 4.6 mm | 35% by volume Methanol/4% by volume Acetonitrile/ 0.34% by mass Phosphoric acid (pH 2.1) | 1.1 | 1.8 | 4.0 |
| 7 | Length 150 mm | 30% by volume Methanol/1% by mass Phosphoric acid (pH 1.8) | 1.1 | 4.6 | 12.2 |
| Comparative Example | | | | | |
| 2 | ODS Column (pH range 2-7.5) Particle size 5 μm Inner diameter 4.6 mm Length 150 mm | 35% by volume Methanol/0.4% by mass Formic acid (pH 2.5) | 1.1 | 9.0 | 9.0 |

* Oxidized PQQ: Oxidized pyrroloquinoline quinone disodium salt
* Reduced PQQ: Reduced pyrroloquinoline quinone disodium salt As shown in Table 1, it was found that, in Comparative Example 2, in which phosphoric acid in the eluent was changed into formic acid, the oxidized pyrroloquinoline quinone disodium salt and the reduced pyrroloquinoline quinone disodium salt could not be separated.

Examples 8 to 16: Analysis Including Pretreatment Step

An aqueous solution containing the oxidized pyrroloquinoline quinone disodium salt (100 mg/L) and pretreatment liquid listed in Table 2 were mixed, the mixture was left to stand under the predetermined conditions (pretreatment step) to prepare each analysis sample. Analysis was performed under the following HPLC analysis conditions using the each obtained analysis sample.

(HPLC Analysis Conditions)

Analyzer: Agilent 1100 series (manufactured by Agilent Technologies, Inc.)

Reversed phase column: ODS column (pH range: 2 to 7.5) 5 μm in particle size and 4.6 mm in inner diameter×150 mm in length Eluent 1: 35% by volume methanol/0.34% by mass phosphoric acid (pH 2.1)

Flow velocity: 1.5 mL/min

Column temperature: 40° C.

Injection volume: 20 μL

Analysis time: 20 min

Detector UV: 259 nm, 320 nm

Analysis time: 40 min

The peak areas of the reduced pyrroloquinoline quinone disodium salt with respect to the total areas of the peaks of the oxidized pyrroloquinoline quinone disodium salt and the peaks of the reduced pyrroloquinoline quinone disodium salt were calculated based on the chromatogram at 259 nm obtained by the analysis result. Table 2 shows the calculated area ratios.

TABLE 2

| Example | Composition of pretreatment liquid | Treatment temperature (° C.) | Treatment time (h) | Oxidized PQQ (%) | Reduced PQQ (%) |
|---|---|---|---|---|---|
| 8 | Ascorbic acid 10% by mass | Room temperature | 1 | 3 | 97 |
| 9 | Ascorbic acid 5% by mass | Room temperature | 1 | 5 | 95 |
| 10 | Ascorbic acid 1% by mass | Room temperature | 1 | 1 | 89 |
| 11 | Ascorbic acid 10% by mass, Methanol 70% by volume, Phosphoric acid 0.85% by mass | 50° C. | 0.25 | 0.5 | 99.5 |
| 12 | Ascorbic acid 10% by mass, Methanol 70% by volume, Phosphoric acid 0.85% by mass | 50° C. | 0.5 | 0 | 100 |
| 13 | Ascorbic acid 10% by mass, Methanol 70% by volume, Phosphoric acid 0.85% by mass | 50° C. | 1 | 0 | 100 |
| 14 | Ascorbic acid 1% by mass, γ-cyclodextrin 1% by mass | 50° C. | 1 | 0 | 100 |
| 15 | Ascorbic acid 1% by mass, γ-cyclodextrin 2% by mass | 50° C. | 1 | 0 | 100 |
| 16 | None | | | 100 | 0 |

* Oxidized PQQ: Oxidized pyrroloquinoline quinone disodium salt
* Reduced PQQ: Reduced pyrroloquinoline quinone disodium salt Examples 17 to 27: Stability of Reduced PQQ An aqueous solution containing the oxidized pyrroloquinoline quinone disodium salt (100 mg/L or 500 mg/L) and pretreatment liquid listed in Table 2 were mixed, the mixture was left to stand at 50° C. for 1 hour (pretreatment step) to prepare each analysis sample. Analysis was performed under the following HPLC analysis conditions using the each obtained analysis sample. The deposition of reduced PQQ was confirmed 24 hours or more after, followed by analysis.

(HPLC Analysis Conditions)

Analyzer: Agilent 1100 series (manufactured by Agilent Technologies, Inc.)

Reversed phase column: ODS column (pH range: 2 to 7.5) 5 μm in particle size and 4.6 mm in inner diameter×150 mm in length Eluent 1: 35% by volume methanol/0.34% by mass phosphoric acid (pH 2.1)

Flow velocity: 1.5 mL/min

Column temperature: 40° C.

Injection volume: 20 μL

Detector UV: 259 nm, 320 nm

Analysis time: 30 min

The peak areas of the reduced pyrroloquinoline quinone disodium salt with respect to the total areas of the peaks of the oxidized pyrroloquinoline quinone disodium salt and the peaks of the reduced pyrroloquinoline quinone disodium salt were calculated based on the chromatograms at 259 nm obtained by the analysis result. Table 3 shows the calculated area ratios as ratios of reduced PQQ.

TABLE 3

| Example | Oxidized PQQ (mg/L) | Composition of pretreatment liquid | Deposition | Injection volume | Peak area of reduced PQQ (%) |
|---|---|---|---|---|---|
| 17 | 100 | Ascorbic acid 2% by mass, γ-cyclodextrin 2% by mass | Not deposited | 20 μL | 100 |
| 18 | 100 | Ascorbic acid 2% by mass, γ-cyclodextrin 5% by mass | Not deposited | 20 μL | 99 |
| 19 | 100 | Ascorbic acid 2% by mass, Methanol 50% by volume | Not deposited | 20 μL | 99 |
| 20 | 100 | Ascorbic acid 1% by mass, γ-cyclodextrin 1% by mass | Not deposited | 20 μL | 96 |
| 21 | 500 | Ascorbic acid 2% by mass, DMSO Solvent liquid 50% by volume | Not deposited | 4 μL | 100 |
| 22 | 500 | Ascorbic acid 2% by mass, DMFSolvent liquid 50% by volume | Not deposited | 4 μL | 99 |
| 23 | 500 | Ascorbic acid 2% by mass, Methanol 50% by volume | Not deposited | 4 μL | 96 |
| 24 | 500 | Ascorbic acid 2% by mass, Ethylene glycol 50% by volume | Not deposited | 4 μL | 93 |
| 25 | 100 | Ascorbic acid 10% by mass | Deposited | 20 μL | 8 |
| 26 | 100 | Ascorbic acid 5% by mass | Deposited | 20 μL | 23 |
| 27 | 100 | Ascorbic acid 10% by mass, Methanol 50% by volume | Deposited | — | — |

* Peak area of reduced PQQ: Peak area of reduced pyrroloquinoline quinone disodium salt with respect to total area of the peak of oxidized pyrroloquinoline quinone disodium salt and the peak of reduced pyrroloquinoline quinone disodium salt
* An assay was not performed.

According to the Examples 25 to 27, reduced pyrroloquinoline quinone deposited easily, and when the analysis sample containing ascorbic acid alone was stored for a long period of time, reduced pyrroloquinoline quinone might deposit from the analysis sample as mentioned above. It was found that, as shown in Examples 17 to 24, the use of cyclodextrin or an organic solvent meanwhile enables stabilization of reduced pyrroloquinoline quinone in a solution.

Quantitative Experiment 1

An aqueous solution containing a pyrroloquinoline quinone disodium salt at 20 mg/L, an aqueous solution containing a pyrroloquinoline quinone disodium salt at 40 mg/L, and an aqueous solution containing a pyrroloquinoline quinone disodium salt at 80 mg/L were provided. An aqueous 10% by mass ascorbic acid solution was mixed as pretreatment liquid with these aqueous solutions separately, and the mixtures were left to stand at normal temperature (23° C.) for 1 hour to prepare three analysis samples. Then, analysis was performed under the following HPLC analysis conditions.

(HPLC Analysis Conditions)

Analyzer: Agilent 1100 series (manufactured by Agilent Technologies, Inc.)

Reversed phase column: ODS column (pH range: 1 to 10) 5 μm in particle size and 4.6 mm in inner diameter×150 mm in length Eluent 1: 35% by volume methanol/4% by volume acetonitrile/0.34% by mass phosphoric acid (pH 2.1)

Flow velocity: 1.5 mL/min

Column temperature: 40° C.

Injection volume: 20 μL

Detector UV: 259 nm, 320 nm

Analysis time: 30 min

The peak area of the reduced pyrroloquinoline quinone disodium salt which appeared at an elution time of 4.0 was calculated based on the obtained chromatogram as to each of three analysis samples. In this case, the peak area of the reduced pyrroloquinoline quinone disodium salt which appeared at an elution time of 4.0 was calculated with both a chromatogram obtained by absorption at a wavelength of 259 nm and a chromatogram obtained by absorption at a wavelength of 320 nm using the detector UV.

Figure 4:
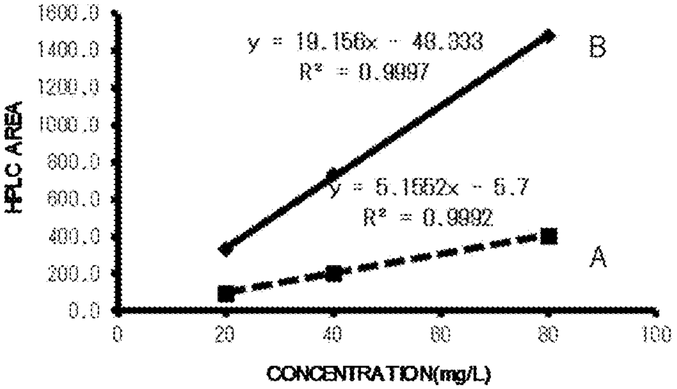
FIG. 4 shows a graph indicating the relationship between the peak area and the concentration of the pyrroloquinoline quinone disodium salt in an analysis sample in Quantitative Experiment 1.

FIG. 4 shows the relationship between the peak area and the concentration of the pyrroloquinoline quinone disodium salt in the analysis sample with the axis of ordinates showing the peak area based on the chromatogram obtained by absorption at a wavelength of 259 nm and the axis of abscissas showing the concentration of the pyrroloquinoline quinone disodium salt used in the preparation of the analysis sample. FIG. 4 similarly shows the relationship between the peak area and the concentration of the pyrroloquinoline quinone disodium salt in the analysis sample in the chromatogram obtained by absorption at a wavelength of 320 nm.

The straight line A is a straight line showing the relationship between the peak area based on the chromatogram obtained by absorption at a wavelength of 259 nm and the concentration of the pyrroloquinoline quinone disodium salt in the analysis sample. The straight line B is a straight line showing the relationship between the peak area based on the chromatogram obtained by absorption at a wavelength of 320 nm and the concentration of the pyrroloquinoline quinone disodium salt in the analysis sample.

Quantitative Experiment 2

Moreover, it was confirmed whether quantitativeness could be confirmed also under different analysis conditions. First, an aqueous solution containing a pyrroloquinoline quinone disodium salt at 20 mg/L, an aqueous solution containing a pyrroloquinoline quinone disodium salt at 40 mg/L, an aqueous solution containing a pyrroloquinoline quinone disodium salt at 60 mg/L, and an aqueous solution containing a pyrroloquinoline quinone disodium salt at 80 mg/L were provided. An aqueous solution containing 2% by mass ascorbic acid and 2% by mass γ-cyclodextrin was mixed as pretreatment liquid with these aqueous solutions separately, and the mixtures were left to stand at 50° C. for 1 hour to prepare four analysis samples. Then, analysis was performed under the following HPLC analysis conditions.

(HPLC Analysis Conditions)

Analyzer: Agilent 1100 series

Reversed phase column: ODS column (pH range: 2 to 7.5) 5 μm in particle size and 4.6 mm in inner diameter×150 mm in length Eluent 1: 35% by volume methanol/0.34% by mass phosphoric acid (pH 2.1)

Flow velocity: 1.5 mL/min

Column temperature: 40° C.

Injection volume: 20 μL

Detector UV: 259 nm, 320 nm

Analysis time: 30 min

The peak area of the reduced pyrroloquinoline quinone disodium salt which appeared at an elution time of 9.7 was calculated based on the obtained chromatogram as to each of four analysis samples. In this case, the peak area of the reduced pyrroloquinoline quinone disodium salt which appeared at an elution time of 9.7 was calculated with the chromatogram obtained by absorption at a wavelength of 320 nm.

Figure 5:
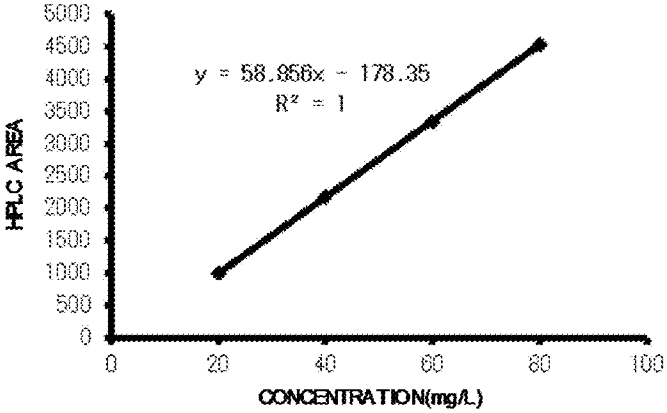
FIG. 5 shows a graph indicating the relationship between the peak area and the concentration of the pyrroloquinoline quinone disodium salt in an analysis sample in Quantitative Experiment 2.

FIG. 5 shows the relationship between the peak area and the concentration of the pyrroloquinoline quinone disodium salt in the analysis sample with the axis of ordinates showing the peak area based on the chromatogram obtained by absorption at a wavelength of 320 nm and the axis of abscissas showing the concentration of the pyrroloquinoline quinone disodium salt used in the preparation of the analysis sample.

The straight line is a straight line showing the relationship between the peak area based on the chromatogram obtained by absorption at a wavelength of 320 nm and the concentration of the pyrroloquinoline quinone disodium salt in the analysis sample.

As shown in FIGS. 4 to 5, it was found that the peak area and the concentration of the pyrroloquinoline quinone disodium salt in the analysis sample have linearity, and these can serve as good calibration curves for calculating the concentration of the pyrroloquinoline quinone disodium salt from the peak area. The R2 of these calibration curves by the least square method was 0.999 or more, and these calibration curves have high correlativity at a concentration of 20 mg/L to 80 mg/L.

Example 28

First, 500 mL of a beverage having a composition shown in Table 4 was prepared. Then, 1 g of an aqueous solution containing 2% by mass ascorbic acid and 2% by mass γ-cyclodextrin was mixed as pretreatment liquid with 1 g of the obtained beverage, and the mixture was left to stand at 50° C. for 1 hour to prepare an analysis sample.

TABLE 4

| Component | Weight |
|---|---|
| Lemon flavor | 1.0 g |
| Ascorbic acid | 0.5 g |
| Citric acid | 0.3 g |
| Sodium citrate | 0.2 g |
| Acesulfame K | 0.1 g |
| Sucralose | 0.01 g |
| BioPQQ | 0.022 g |
| Food red No. 2 | 0.002 g |

Then, the obtained analysis sample was analyzed under the following HPLC analysis conditions.

(HPLC Analysis Conditions)

Analyzer: Agilent 1100 series

Reversed phase column: ODS column (pH range: 2 to 7.5) 5 μm in particle size and 4.6 mm in inner diameter×150 mm in length Eluent 1: 35% by volume methanol/0.34% by mass phosphoric acid (pH 2.1)

Flow velocity: 1.5 mL/min

Column temperature: 40° C.

Injection volume: 20 μL

Detector UV: 259 nm, 320 nm

Analysis time: 30 min

Figure 6:
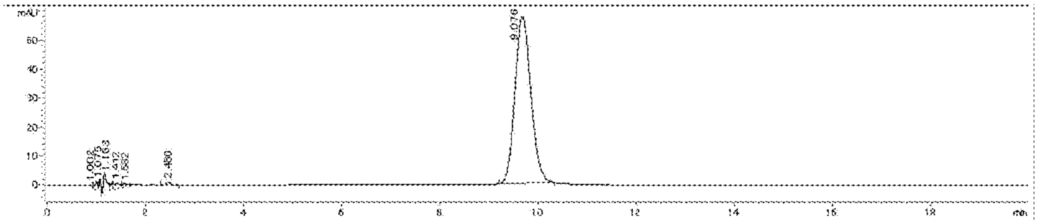
FIG. 6 shows a chromatograph obtained in Example 28.

FIG. 6 shows the consequently obtained chromatogram. In this analysis, the concentration of the pyrroloquinoline quinone contained in the analysis sample was calculated at 21.8 mg/L. When the concentration of pyrroloquinoline quinone contained in the analysis sample was calculated from the peak area using the calibration curve produced in Quantitative Test 2, the concentration was estimated at 21.6 mg/L. The ratio of the concentration of pyrroloquinoline quinone calculated by the calibration curve to the concentration of pyrroloquinoline quinone actually contained in the analysis sample (recovery rate) was 99%. This analysis result showed that a result excellent in quantitativeness was obtained.

Comparative Example 7

Figure 7:
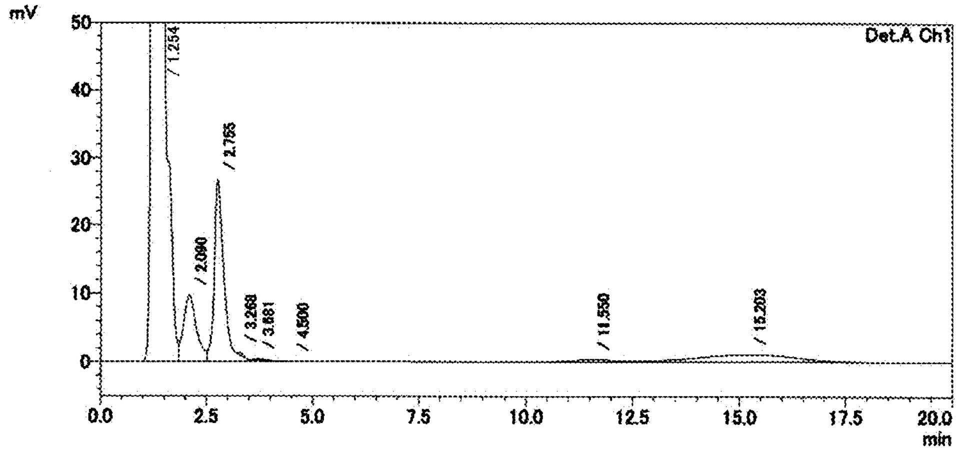
FIG. 7 shows a chromatograph obtained in Comparative Example 7.

The above-mentioned beverage was analyzed under the conditions of Comparative Example 1. The recovery rate was calculated at 103%. Oxidized PQQ and reduced PQQ was not separated completely, and Comparative Example 7 was not suitable as an analysis method. FIG. 7 shows the results.

Example 29

(Eluent)

Eluent used in Example 29 was obtained by mixing water and methanol at a volume ratio of 70:30 and adding hydrochloric acid (36% hydrochloric acid=concentrated hydrochloric acid) to the mixed liquid so that the concentration of hydrochloric acid was 0.4% by mass.

(HPLC Analysis Conditions)

Analyzer: LC-20AD

Reversed phase column: ODS column (pH range: 1 to 10) 5 um in particle size and 4.6 mm in inner diameter×150 mm in length Eluent: 30% by volume methanol/0.14% by mass hydrochloric acid (0.4% by mass concentrated hydrochloric acid was added) (pH 1.6)

Flow velocity: 1.5 mL/min

Column temperature: 40° C.

Injection volume: 10 μL

Detector UV: 320 nm

Analysis time: 30 min (Analysis)

An aqueous pyrroloquinoline quinone disodium salt solution (40 mg/L) and an aqueous solution containing 2% by mass ascorbic acid and 2% by mass γ-cyclodextrin were mixed at 1:1 as pretreatment to prepare an analysis sample. Analysis operation was performed under the above-mentioned HPLC analysis conditions within 60 minutes after the preparation of the analysis sample.

Figure 8:
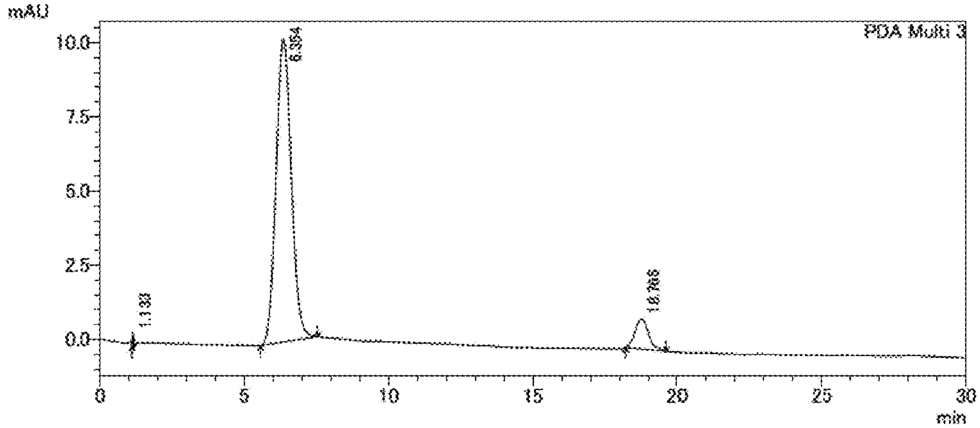
FIG. 8 shows the chromatograph of an aqueous PQQ solution (40 mg/L) before pretreatment obtained in Example 29.
Figure 9:
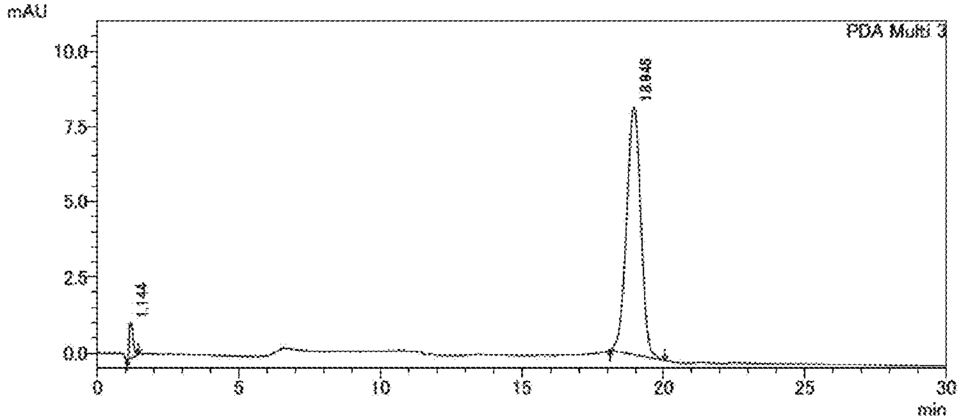
FIG. 9 shows the chromatograph of an aqueous PQQ solution after pretreatment obtained in Example 29.

FIG. 8 shows the chromatogram of the aqueous PQQ solution (40 mg/L) before pretreatment. The peak of PQQ was detected at 6.4 minutes. FIG. 9 shows the result of the pretreated aqueous PQQ solution. Ascorbic acid in the pretreatment liquid exhibited a peak at 1.2 minutes, and the peak of reduced PQQ (20 mg/L) was detected at 18.9 minutes.

Figure 10:
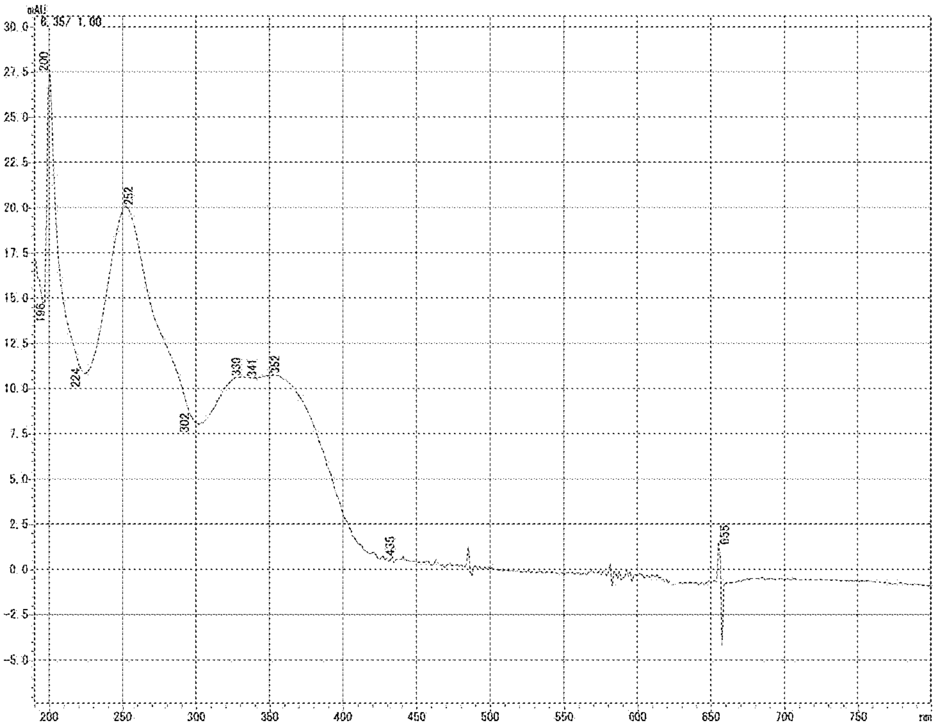
FIG. 10 shows the absorption spectrum in the UV-VIS of a fraction at an elution time of 6.4 minutes in the chromatogram in FIG. 8.
Figure 11:
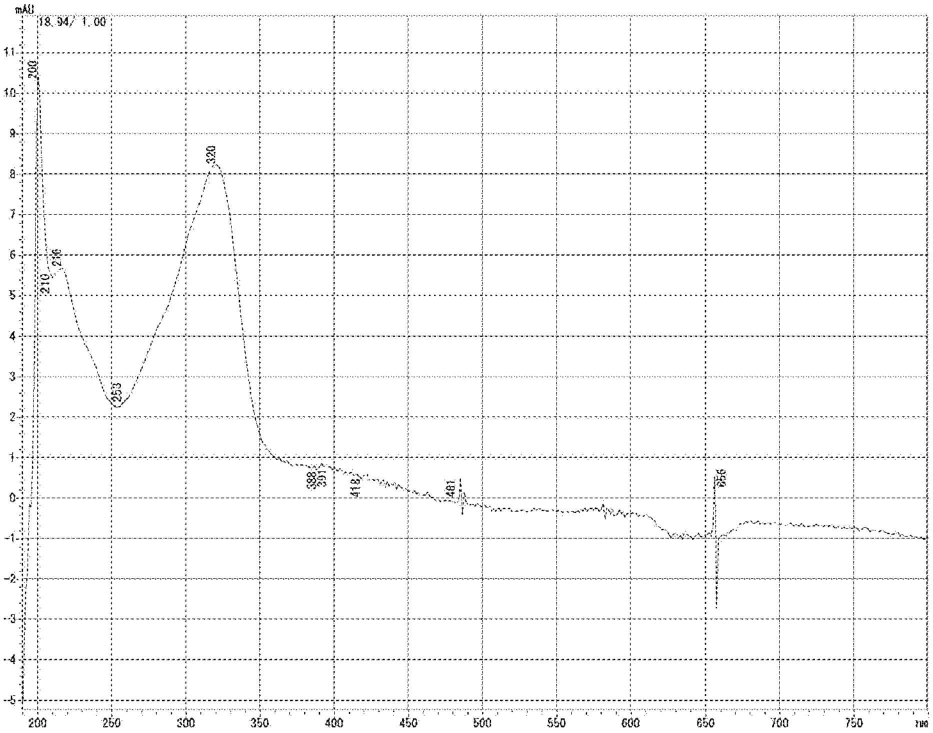
FIG. 11 shows the absorption spectrum in the UV-VIS of a fraction at an elution time of 18.9 minutes in the chromatogram in FIG. 9.

While separation was performed with the HPLC analyzer, the spectrum of eluate which flows out of the reversed phase column was measured without stopping liquid feeding. FIG. 10 shows the absorption spectrum in the UV-VIS at an elution time of 6.4 minutes in FIG. 8, and FIG. 11 shows the absorption spectrum in the UV-VIS at an elution time of 18.9 minutes in FIG. 9. This showed that also when hydrochloric acid was used as eluent, oxidized and reduced PQQ could be separated.

The invention claimed is:

1. A high performance liquid chromatography analysis method, comprising:

preparing a sample for high performance liquid chromatography comprising reduced pyrroloquinoline quinone or a salt thereof from a specimen; and separating the reduced pyrroloquinoline quinone or a salt thereof in the sample from the specimen using interaction between a stationary phase and a mobile phase by a high performance liquid chromatography method using a reversed phase column as the stationary phase and using an eluent comprising from 0.050 to 1.5% by mass of phosphoric acid, hydrochloric acid, or a combination thereof, and from 20 to 50% by volume of methanol, acetonitrile, or a combination thereof, as the mobile phase, wherein the reduced pyrroloquinoline quinone is represented by the following formula (2):

(2)

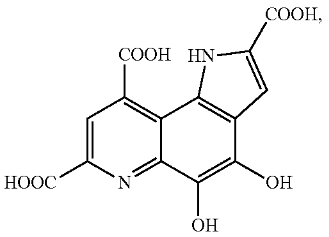

wherein the sample for high performance liquid chromatography further comprises oxidized pyrroloquinoline quinone, and the separating comprises separating the reduced pyrroloquinoline quinone and the oxidized pyrroloquinoline quinone in the sample for high performance liquid chromatography.

wherein the oxidized pyrroloquinoline quinone is represented by the following formula (1):

(1)

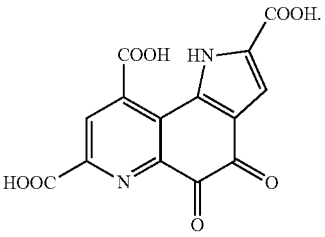

2. The high performance liquid chromatography analysis method according to claim 1, wherein the eluent has a pH of 2.8 or less.

3. The high performance liquid chromatography analysis method according to claim 1, wherein the specimen is a beverage.

4. The high performance liquid chromatography analysis method according to claim 2, wherein the specimen is a beverage.

5. The high performance liquid chromatography analysis method according to claim 1, wherein the eluent comprises from 0.050 to 1.5% by mass of phosphoric acid and hydrochloric acid and from 20 to 50% by volume of methanol and acetonitrile as the mobile phase.

6. The high performance liquid chromatography analysis method according to claim 5, wherein the eluent has a pH of 2.8 or less.

7. The high performance liquid chromatography analysis method according to claim 1, wherein the eluent comprises from 0.050 to 1.5% by mass of phosphoric acid or hydrochloric acid and from 20 to 50% by volume of methanol or acetonitrile as the mobile phase.

8. The high performance liquid chromatography analysis method according to claim 7, wherein the eluent has a pH of 2.8 or less.

* * * * *